June 15, 1965  K. G. KING  3,189,811
BRAKING CIRCUITS FOR D.C. MOTORS

Filed Oct. 31, 1961  2 Sheets-Sheet 1

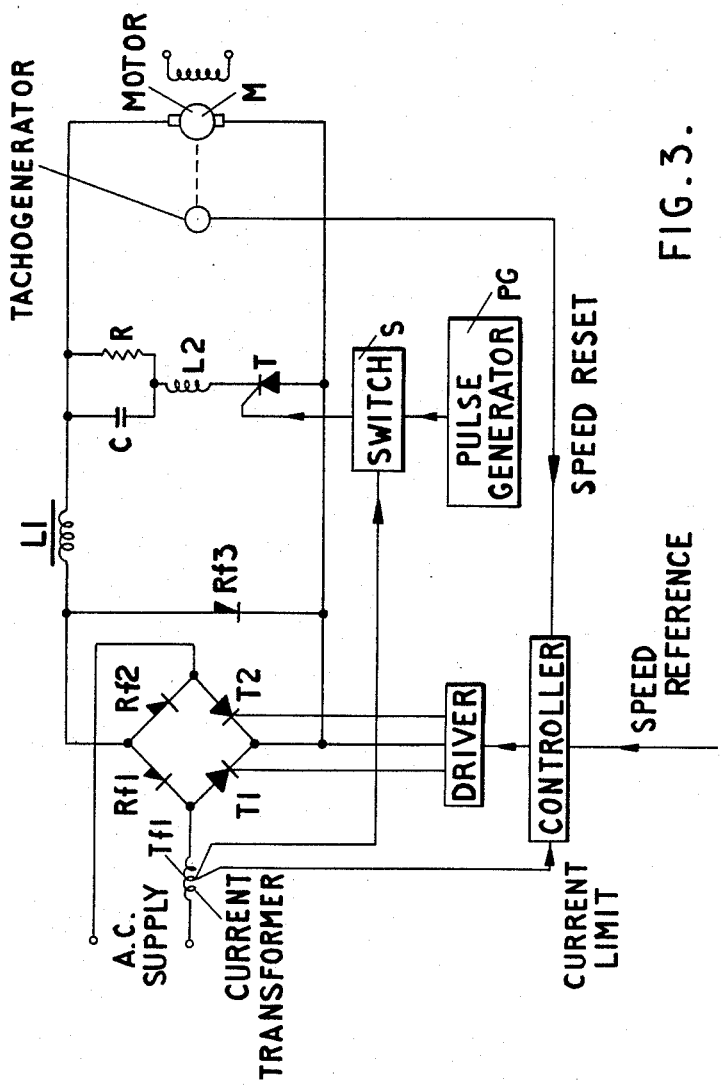

United States Patent Office 3,189,811
Patented June 15, 1965

3,189,811
BRAKING CIRCUITS FOR D.C. MOTORS
Kenneth G. King, London, England, assignor to Westinghouse Brake and Signal Company Limited, London, England
Filed Oct. 31, 1961, Ser. No. 148,925
Claims priority, application Great Britain, Nov. 2, 1960, 37,632/60
3 Claims. (Cl. 318—269)

This invention relates to braking circuits for D.C. motors and more especially for D.C. motors of the kind in which the speed is varied by controlling the armature voltage which is obtained from a rectifier, the field voltage being constant.

The rectifier may be a controllable rectifier incorporating controllable rectifying means or may be an ordinary rectifier with transductor control.

When the motor is to be slowed down quickly energy cannot be taken from the armature through the rectifier and some form of dynamic braking is necessary.

An object of the invention is a method whereby the dynamic braking can be switched on reliably by a suitable control signal without recourse to any preparation of the circuit by a previous event.

The invention consists in a variable speed D.C. motor comprising field means, an armature, a variable voltage rectified supply means for the armature, a self-oscillatory resistance circuit for connection across the armature to pass current for the purpose of braking the motor, controlled rectifier means in series with the resistance, switch means connected to be operated by a fall in the supply from said supply means, and a source of repetitive triggering pulses connected by the switch means, when operated, to fire the controlled rectifier means.

The invention will be further described with reference to the accompanying drawings.

FIGURE 3 is a block diagram of the complete control system of this invention.

Figure 1:
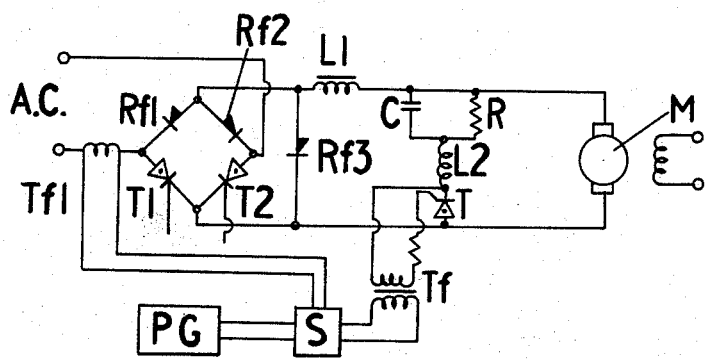
FIGURE 1 is a circuit diagram of an arrangement according to the invention.

In the drawings, an A.C. supply is connected to a bridge rectifier arrangement comprising two ordinary rectifiers Rf1, Rf2, and two controllable rectifiers T1, T2, which may be of the kind known as trinistors. The control circuit is not shown but may be a suitable circuit of the kind used in similar applications.

The output from the rectifiers is fed over a smoothing circuit comprising rectifier Rf3 and inductance L1 to the armature of the motor M.

Also across the armature of the motor M is a series inverter circuit comprising condenser C and resistance R in parallel series with inductance L2 and a controllable semi-conductor device T which may be a trinistor, that is a four layer p-n-p-n silicon diode with a connection to the inner p-layer.

The cathode and inner p-layer of the trinistor T are connected to the secondary of a transformer Tf.

Also connected to one of the A.C. supply leads is a current transformer Tf1 which feeds a switch S.

A pulse generator PG supplies switch S and the output from the switch goes to the primary of transformer Tf.

The pulse generator preferably generates pulses at the rate of 1,000 c./s., and this frequency may be varied in order to vary the mean braking current. The natural frequency of the oscillatory circuit comprising the inductor, the capacitor, and the resistor, should be greater than the highest rate of firing pulses applied through the switch S.

In operation when the current in transformer Tf1 falls to small value or zero the switch S is operated to supply pulses from the pulse generator PG to the control lead of the trinistor T which fires to provide a current path for the back E.M.F. of the armature of motor M.

Under normal operation of the motor no current is taken.

The pulse generator may be of a known type, for example, a blocking oscillator or multivibrator.

Figure 2:
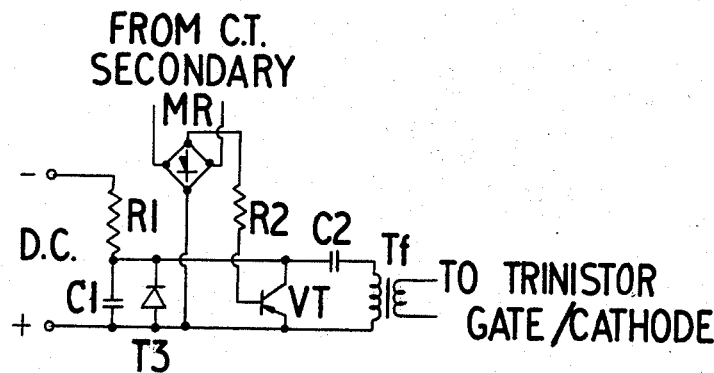
FIGURE 2 is a circuit diagram of an oscillator and switch suitable for incorporation in the circuit of FIGURE 1.

FIGURE 2 shows a relaxation oscillator. An auxiliary D.C. supply feeds resistance R1 and condenser C1. Condenser C1 supplies a p-n-p-n diode T3 and a transistor VT is connected over resistance R2 to the output terminals of full wave rectifier MR the input of which is fed from the secondary of the current transformer Tf1 (FIGURE 1).

When the transistor switch is operated it supplies pulses over condenser C2 to the primary of transformer Tf the secondary of which supplies the gate-cathode circuit of the trinistor T.

Various modifications may be made within the scope of the invention. Thus, the switching signal to S may be derived from the control arrangement of the bridge rectifier. Also other forms of series inverter circuits may be used and well known D.C. chopper circuits for the repetitive switching.

I claim:

1. A variable speed D.C. motor control circuit comprising field means, an armature, a variable voltage rectified supply means to apply current to the armature, a control circuit for connection across the armature, said control circuit including in series a controllable semiconductor device, a resistance and an inductance, said resistance having a capacitor connected in parallel thereto for forming a self-oscillatory circuit, switch means for said controllable semiconductor means and connected to be operated by a fall in the supply from said supply means, and a source of highly repetitive triggering pulses connected by the switch means, when operated by said fall, to control the firing of the controllable semiconductor means, so that the control circuit passes current for the purpose of braking the motor.

2. A variable speed D.C. motor control circuit as claimed in claim 1, in which the controllable semiconductor means is a trinistor.

3. A variable speed D.C. motor control circuit as claimed in claim 2, in which a smoothing circuit is applied between the variable voltage rectified supply means and the armature.

References Cited by the Examiner
UNITED STATES PATENTS
2,413,070  12/46  Reeves _____ 318—380
2,965,827  12/60  Hohne _____ 318—380

ORIS L. RADER, Primary Examiner.